United States Patent
Kim et al.

(10) Patent No.: US 11,609,200 B2
(45) Date of Patent: Mar. 21, 2023

(54) SENSOR MODULE

(71) Applicant: LG Electronics Inc., Seoul (KR)

(72) Inventors: Jinho Kim, Seoul (KR); Insung Hwang, Seoul (KR); Seongwon Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 642 days.

(21) Appl. No.: 16/669,060

(22) Filed: Oct. 30, 2019

(65) Prior Publication Data

US 2020/0309723 A1 Oct. 1, 2020

(30) Foreign Application Priority Data

Mar. 26, 2019 (KR) ........................ 10-2019-0034371

(51) Int. Cl.
*G01N 27/12* (2006.01)
(52) U.S. Cl.
CPC ................................. *G01N 27/122* (2013.01)
(58) Field of Classification Search
CPC ...... G01N 27/02; G01N 27/04; G01N 27/045; G01N 27/122
USPC ........................................... 73/335.05, 31.05
See application file for complete search history.

(56) References Cited

U.S. PATENT DOCUMENTS

| | | | |
|---|---|---|---|
| 5,055,270 A | 10/1991 | Consadori et al. | |
| 6,096,186 A | 8/2000 | Warburton | |
| 2013/0019655 A1* | 1/2013 | Nakagawa | G01N 27/419 |
| | | | 73/31.05 |

FOREIGN PATENT DOCUMENTS

| | | | |
|---|---|---|---|
| CN | 103558260 | | 2/2014 |
| CN | 103558260 A | * | 2/2014 |
| CN | 106645310 | | 5/2017 |
| JP | H01150850 | | 6/1989 |
| JP | 2578624 | | 2/1997 |
| JP | 10082755 A | * | 3/1998 |
| JP | 2015200626 | | 11/2015 |
| KR | 100831589 | | 5/2008 |
| WO | WO2018131503 | | 7/2018 |

OTHER PUBLICATIONS

Nyce; "Linear Position Sensors Theory and Application"; Pub. Date 2004; Wiley & Sons; Chapter 3 (Year: 2004).*
New Jersey Department of Health; Ethyl Alcohol Hazardous Substance Fact Sheet; NJ Dept. of Health; Pub. Date 2016 (Year: 2016).*
PCT International Search Report in International Application No. PCT/KR2019/014214, dated Feb. 10, 2020, 9 pages.
Extended European Search Report in European Appln. No. 19920770.5, dated Nov. 11, 2022, 8 pages.
Jayconsystems.com [online], "Understanding a Gas Sensor," <https://jayconsystems.com/blog/understanding-a-gas-sensor>, retrieved on Dec. 7, 2022, 20 pages.

* cited by examiner

*Primary Examiner* — Lee E Rodak
*Assistant Examiner* — Rahul Maini
(74) *Attorney, Agent, or Firm* — Fish & Richardson P.C.

(57) ABSTRACT

A sensor module includes a sensor configured to sense gas in air, a load resistor connected to the sensor, and a processor configured to determine a gas concentration of the gas in the air based on an internal resistor of the sensor and the load resistor. The processor is configured to obtain an electrical conductivity change amount of the sensor and adjust a load resistance value of the load resistor based on the electrical conductivity change amount.

18 Claims, 7 Drawing Sheets

SENSOR MODULE

CROSS-REFERENCE TO RELATED APPLICATIONS

The present application claims priority under 35 U.S.C. 119 and 35 U.S.C. 365 to Korean Patent Application No. 10-2019-0034371 filed on Mar. 26, 2019, which is hereby incorporated by reference in its entirety.

TECHNICAL FIELD

The present disclosure relates to a sensor module.

BACKGROUND

A gas sensor is a device that can detect a specific chemical substance contained in air, measure the concentration of the chemical substance, and output the measurement result. In some examples, the gas sensor may include a semiconductor sensor, a combustion sensor, and/or an electrochemical sensor.

The semiconductor sensor may use a change in electrical conductivity that occurs when a gas is brought into contact with a surface of a ceramic semiconductor. An example of the operation principle of the semiconductor sensor will be described below with reference to FIGS. 1A to 1C.

As illustrated in FIGS. 1A to 1C, the semiconductor sensor may include a substrate 2, a sensing material 3 attached to one surface of the substrate 2, and a heater 4 attached to the other surface of the substrate 2. A pair of electrodes 5 may be formed on the substrate 2. The pair of electrodes 5 may be disposed between the substrate 2 and the sensing material 3.

In some cases, a current flowing between the pair of electrodes 5 may be determined by an internal resistance of the sensing material 3. For example, as the internal resistance of the sensing material 3 decreases, the current flowing between the pair of electrodes 5 may increase. In another, as the internal resistance of the sensing material 3 increases, the current flowing between the pair of electrodes 5 may decrease.

In some examples, referring to FIG. 1A, when air is clean, electron in the sensing material 3 may combine with oxygen adsorbed on the surface of the sensing material 3. In this case, the resistance inside the sensing material 3 may increase, and the current flowing through the substrate 2 may be small.

In some examples, as illustrated in FIG. 1B, when a gas (for example, carbon monoxide (CO)) is generated in air, oxygen adsorbed on the surface of the sensing material 3 may combine with the gas in the air to cause a reduction reaction on the surface of the sensing material 3. Therefore, electrons may be given to the sensing material 3. As illustrated in FIG. 1C, when the amount of free electrons in the sensing material 3 increases, the internal resistance of the sensing material 3 may decrease. Thus, the current flowing through the substrate 2 may increase.

In some cases, the semiconductor sensor may measure a change in gas concentration in the air by measuring a change in internal resistance caused by an oxidation/reduction reaction in the sensing material 3. For example, the semiconductor sensor may measure the gas concentration in the air based on a ratio ($R_S/R_O$) of the internal resistance ($R_O$) of the sensing material 3 sensed in the clean air to the internal resistance ($R_S$) of the sensing material 3 sensed in the target air.

Here, $R_O$ represents the internal resistance of the sensing material 3 sensed in the clean air, and $R_S$ represents the internal resistance of the sensing material 3 sensed in the air which is a target to be measured.

In some cases, the sensitivity of the semiconductor sensor may be different due to errors in the process, contamination during usage, and the like. When the sensitivity is different, the gas concentration can be differently calculated even when the same type of the semiconductor concentration sensors calculate the gas concentration in the same space.

FIG. 2 is a graph showing an example of gas concentration scattering of the semiconductor sensor according to the sensitivity. Specifically, the graphs shown in FIG. 2 are examples showing gas concentrations calculated using several semiconductor sensors of the same model that have different sensitivities. Referring to FIG. 2, when the ratio ($R_S/R_O$) of the internal resistance ($R_O$) of the sensing material 3 to the internal resistance ($R_S$) of the sensing material 3 sensed in the target air is 0.6, the semiconductor sensors with different sensitivities may output different gas concentrations, 8 ppm, 10 ppm, 20 ppm, and 30 ppm, for example. The different outputs of gas concentrations may deteriorate the reliability of the product.

In some cases, the reliability of the product may be improved by reducing gas concentration scattering of the semiconductor sensor according to the sensitivity.

SUMMARY

The present disclosure provides a sensor module with reduced gas concentration scattering of a sensor according to sensitivity.

The present disclosure also provides a sensor module capable of predicting sensitivity of a sensor and adjusting a load resistance value according to the sensitivity of the sensor.

According to one aspect of the subject matter described in this application, a sensor module includes a sensor configured to sense gas in air, a load resistor connected to the sensor, and a processor configured to determine a gas concentration of the gas in the air based on an internal resistor of the sensor and the load resistor. The processor is configured to obtain an electrical conductivity change amount of the sensor and adjust a load resistance value of the load resistor based on the electrical conductivity change amount.

Implementations according to this aspect may include one or more of the following features. For example, the processor may be configured to determine the electrical conductivity change amount based on a difference between a first output value measured in a first condition by the sensor and a second output value measured in a second condition by the sensor. In some examples, the first condition may be a state in which the sensor is disposed in a first space having a first gas concentration of the gas within a preset clean range, and the second condition may be a state in which the sensor is disposed in a second space having a second gas concentration of the gas within a contamination range that is set to include greater gas concentrations of the gas than the preset clean range.

In some implementations, the processor may be configured to decrease the load resistance value based on an increase of the electrical conductivity change amount.

In some implementations, the sensor module may further include a non-transitory memory configured to store variable resistance information that includes a plurality of load resistance values and a plurality of electrical conductivity change amounts mapped to the plurality of load resistance values, respectively. The processor may be configured to, based on the variable resistance information, determine one of the plurality of load resistance values corresponding to the electrical conductivity change amount.

In some implementations, the processor may be configured to: based on the electrical conductivity change amount corresponding to an average change amount, set the load resistance value to a preset standard resistance value; based on the electrical conductivity change amount being greater than the average change amount, decrease the load resistance value to a first value that is less than the preset standard resistance value by a ratio corresponding to a difference between the electrical conductivity change amount and the average change amount; and based on the electrical conductivity change amount being less than the average change amount, increase the load resistance value to a second value that is greater than the preset standard resistance value by the ratio corresponding to the difference between the electrical conductivity change amount and the average change amount.

In some implementations, the load resistor may include a resistor element, and a contactor defining at least one of a length of the resistor element or a cross-sectional area of the resistor element. The processor may be connected to the contactor and configured to move the contactor relative to the resistor element according to the electrical conductivity change amount.

In some implementations, wherein sensor may include a substrate, a sensing member disposed on a first surface of the substrate, and a heater disposed on a second surface of the substrate opposite to the first surface. The processor may be configured to obtain the electrical conductivity change amount based on a change amount of an internal resistance of the sensing member. In some examples, the processor may be configured to, despite measurements of the internal resistance of the sensing member corresponding to different values in a same air condition, determine one gas concentration corresponding to the measurements by adjusting the load resistance value of the load resistor.

In some implementations, the processor may be configured to, based on a use time of the sensor exceeding a set time after the load resistance value is adjusted, re-obtain the electrical conductivity change amount of the sensor and then change the load resistance value. In some implementations, the sensor may be configured to apply a division voltage to the processor, the division voltage corresponding to a ratio between an internal resistance value of the internal resistor and a sum of the internal resistance value and the load resistance value.

In some implementations, the sensor may be configured to output a plurality of output values corresponding to an electrical conductivity, and the processor may be configured to determine the electrical conductivity change amount of the sensor based on a difference between the plurality of output values.

In some implementations, the processor may be configured to: determine a first difference between the electrical conductivity change amount and a first electrical conductivity change amount among the plurality of electrical conductivity change amounts; determine a second difference between the electrical conductivity change amount and a second electrical conductivity change amount among the plurality of electrical conductivity change amounts; and based on the first difference being less than the second difference, determine a first load resistance value among the plurality of load resistance values corresponding to the first electrical conductivity change amount as an adjusted load resistance value.

In some implementations, the contactor may define a first portion of the resistor element that carries a current and a second portion of the resistor element that does not carry the current. The processor may be configured to, according to the electrical conductivity change amount, move the contactor relative to the resistor element to thereby vary lengths or areas of the first portion and the second portion of the resistor element.

In some implementations, the internal resistor and the load resistor are connected to each other electrically in series, and the heater includes a heater resistor that is connected to the internal resistor and the load resistor electrically in parallel.

According to another aspect, a method is described for sensing gas in air using a sensor module that includes a sensor configured to sense the gas in the air, a load resistor connected to the sensor, and a processor connected to the sensor and the load resistor. The method includes obtaining a first output value measured by the sensor in a first condition, obtaining a second output value measured by the sensor in a second condition, determining an electrical conductivity change amount based on a difference between the first output value and the second output value, and setting a resistance value of the load resistor based on the electrical conductivity change amount.

Implementations according to this aspect may include one or more of the following features. For example, the method may further include, based on setting the resistance value of the load resistor, determining a gas concentration of the gas based on the resistance value of the load resistor and a resistance value of an internal resistor of the sensor.

In some examples, setting the resistance value of the load resistor may include: based on the electrical conductivity change amount corresponding to an average change amount, setting the resistance value of the load resistor to a preset standard resistance value; based on the electrical conductivity change amount being greater than the average change amount, decreasing the resistance value resistance value of the load resistor to a first value that is less than the preset standard resistance value by a ratio corresponding to a difference between the electrical conductivity change amount and the average change amount; and based on the electrical conductivity change amount being less than the average change amount, increasing the resistance value resistance value of the load resistor to a second value that is greater than the preset standard resistance value by the ratio corresponding to the difference between the electrical conductivity change amount and the average change amount.

In some implementations, setting the resistance value of the load resistor may include determining an adjusted resistance value of the load resistor based on variable resistance information that is stored in a non-transitory memory connected to the processor, where the variable resistance information includes a plurality of load resistance values and a plurality of electrical conductivity change amounts mapped to the plurality of load resistance values, respectively.

In some implementations, determining the gas concentration of the gas may include determining one gas concentration despite measurements of the resistance value of the internal resistor of the sensor corresponding to different values in a same air condition.

The details of one or more implementations are set forth in the accompanying drawings and the description below.

Other features will be apparent from the description and drawings, and from the claims.

DETAILED DESCRIPTION

Hereinafter, one or more example implementations will be described in detail with reference to the accompanying drawings.

Figure 3:
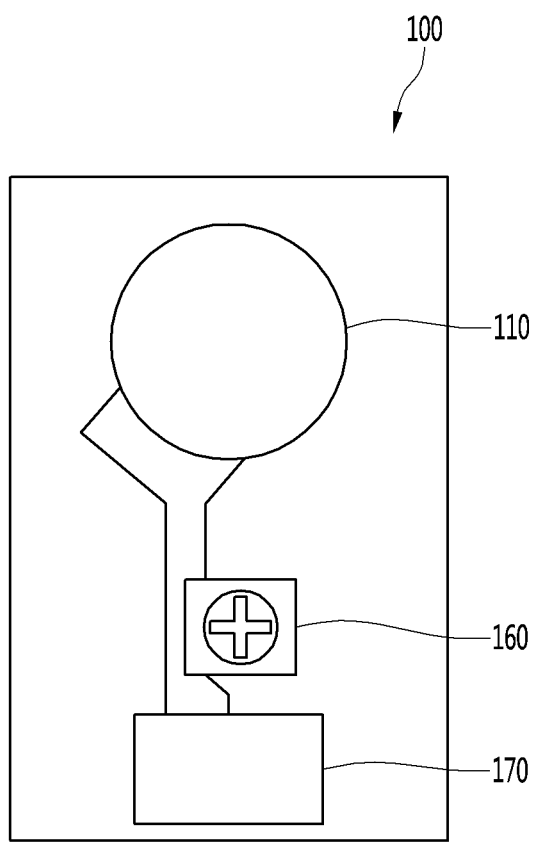
FIG. 3 is a view illustrating an example of a sensor module.
Figure 4:
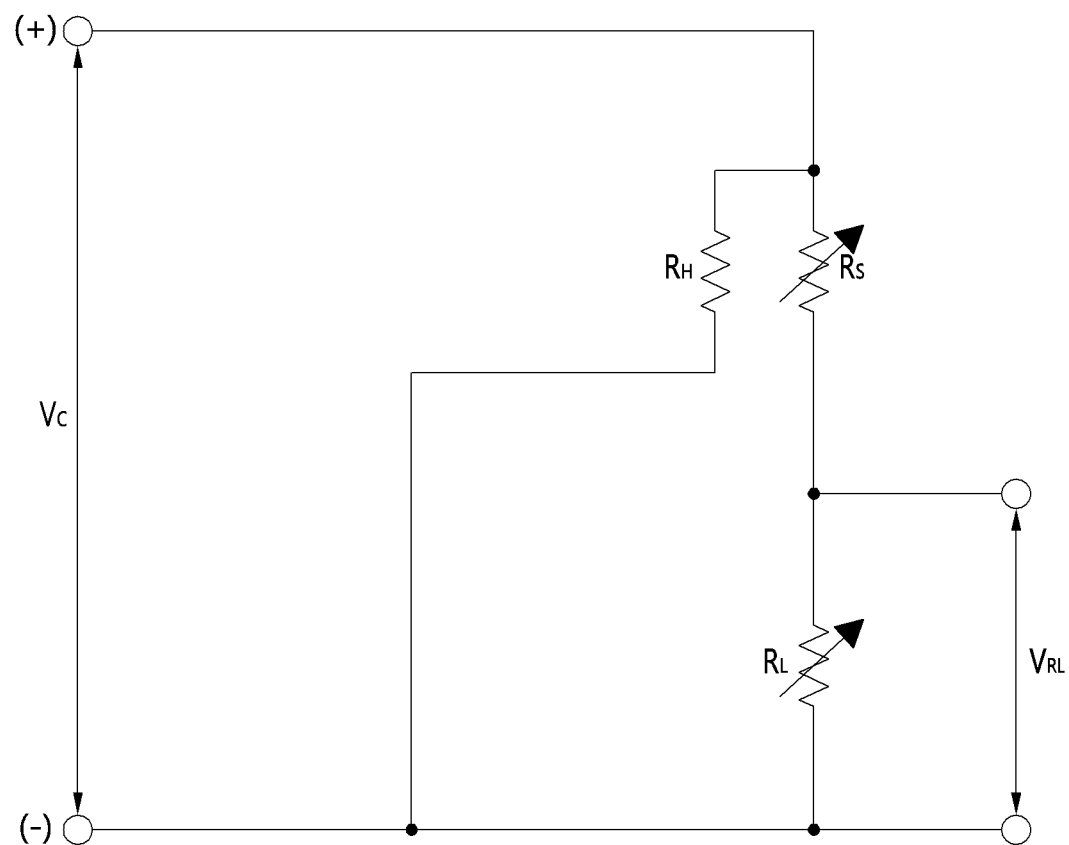
FIG. 4 is a circuit diagram illustrating an example of a connection relationship of resistors provided to the sensor module illustrated in FIG. 3.

FIG. 3 is a view illustrating an example of a sensor module, and FIG. 4 is a circuit diagram illustrating an example of a connection relationship of resistors provided to the sensor module illustrated in FIG. 3.

In some implementations, the sensor module 100 may include a sensor 110, a load resistor 160, and a processor 170.

The processor 170 may calculate a gas concentration in air based on an internal resistor of the sensor 110 and the load resistor 160. For example, the processor 170 may determine a value corresponding to a concentration of a gas included in the air based on a ratio of resistances of the internal resistor of the sensor 110 and the load resistor 160.

Figure 1A:
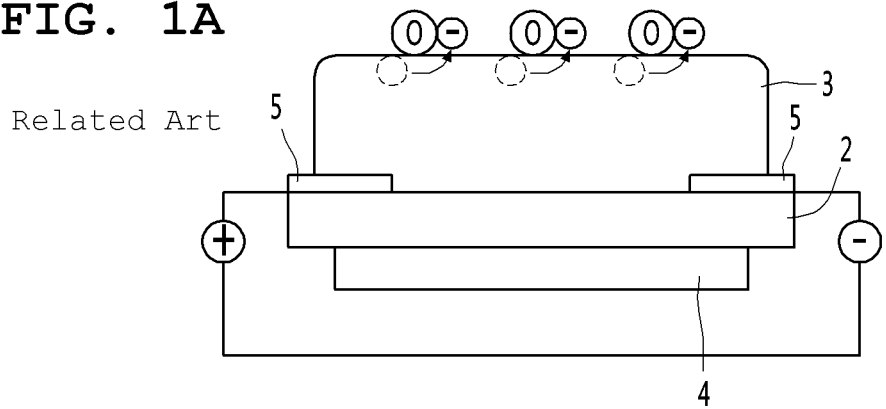
FIGS. 1A to 1C are views illustrating examples of an operation principle of a semiconductor sensor.
Figure 1B:
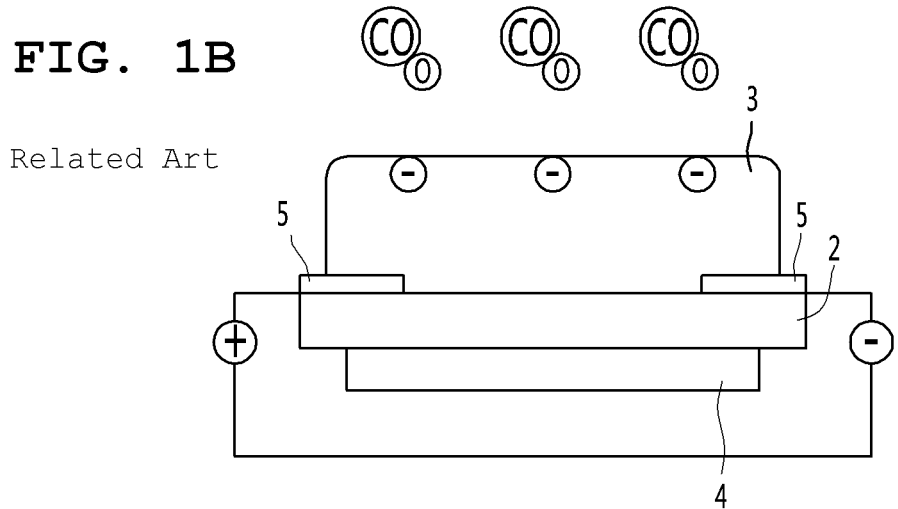
Figure 1C:
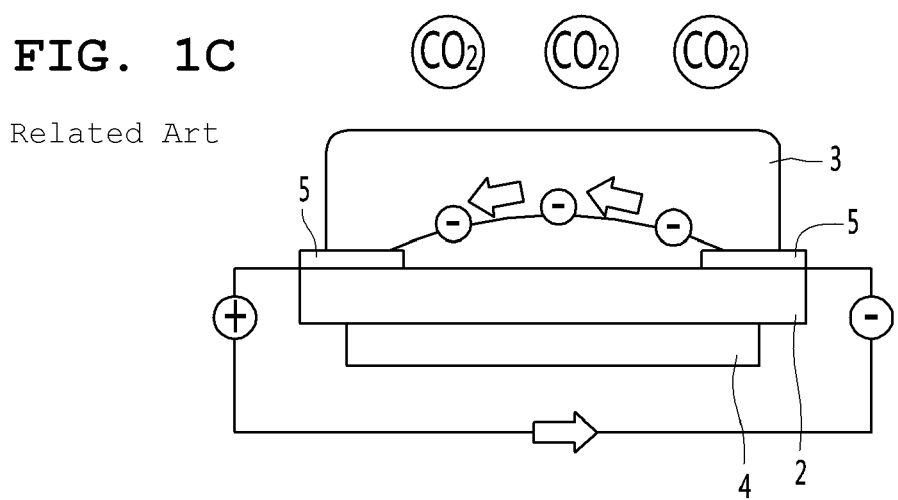
Figure 2:
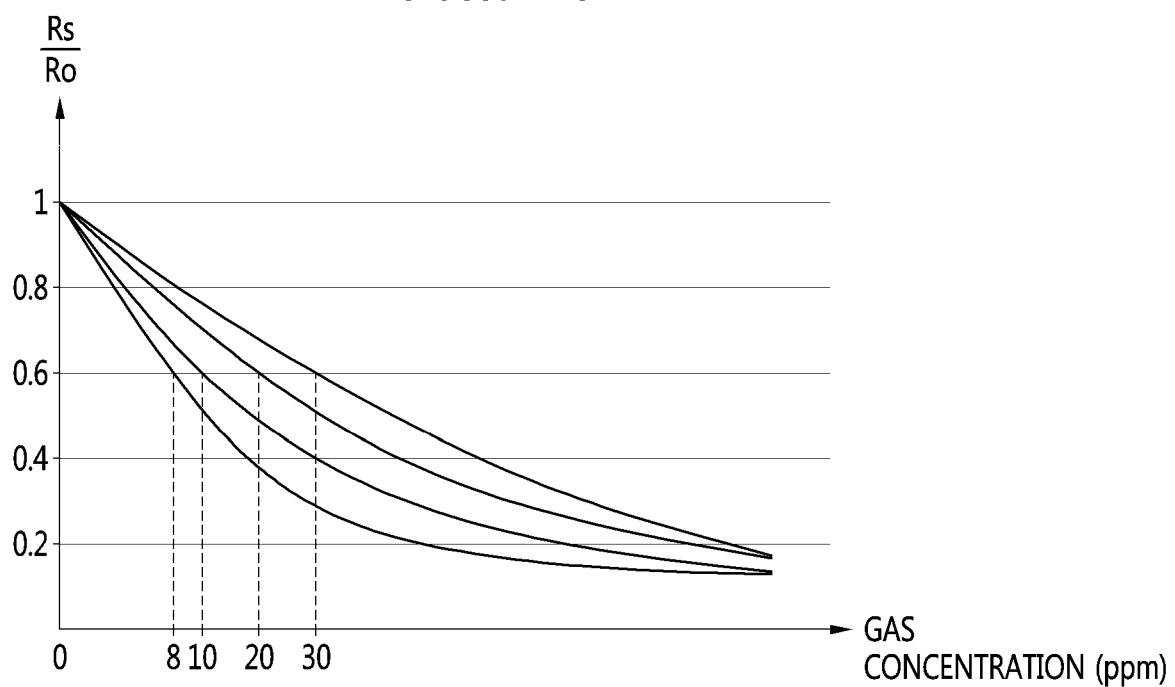
FIG. 2 is a graph showing an example of gas concentration scattering of the semiconductor sensor according to sensitivity.

The sensor 110 may sense gas in air and may be a semiconductor gas sensor. For instance, the sensor 110 may detect one or more of particular gases included in the air. In some implementations, the sensor 110 may include a substrate 2, a sensing member or sensing material 3, and a heater 4 (see FIG. 1). For instance, the sensing material 3 may be disposed on a first surface (e.g., an upper surface) of the substrate 2, and the heater 4 may be disposed on a second surface (e.g., a lower surface) of the substrate 2. The operation principle of the sensor 110 may be the same as or similar to that described with reference to FIG. 1.

In some examples, the sensor 110 may include a gas detector made of a semiconductor, metal-oxide (e.g., silicon, tin dioxide, zinc oxide, etc.) and configured to detect the presence of gases (e.g., oxygen, hydrogen, water vapor, alcohol vapor, and harmful gases such as carbon monoxide) based on a chemical reaction occurring at a contact area between the semiconductor and the gases.

In some implementations, the load resistor 160 may be connected to the sensor 110. In some examples, the load resistor 160 may be connected in parallel to a heater resistor $R_H$. The heater resistor $R_H$ may refer to a resistor of the heater 4.

The sensor 110 and the load resistor 160 may correspond to a gas sensing part of the sensor module 100. The gas sensing part may apply, to the processor 170, a division voltage $V_{RL}$ obtained by the resistor $R_S$ of the sensor 110 and the load resistor $R_L$, in which the division voltage $V_{RL}$ may change according to the degree of contamination of air. The processor 170 may calculate the gas concentration in air based on the applied voltage $V_{RL}$. For example, the processor 170 may calculate the gas concentration through an operation of dividing the product of the circuit voltage $V_C$ and the resistance value of the resistor $R_S$ of the sensor 110 by the sum of the resistance value of the resistor $R_S$ and the resistance of the sensor 110 of the load resistor $R_L$.

The resistor $R_S$ of the sensor 110 may refer to the internal resistor of the sensing material 3. In particular, the resistor $R_S$ of the sensor 110 may be the internal resistor of the sensing material 3 sensed by the sensor 110 on the target air to be calculated by the sensor module 100.

The resistance value of the resistor $R_S$ of the sensor 110 may be calculated by dividing the circuit voltage $V_C$ applied to the sensor 110 by the current flowing between the electrodes 5 of the substrate 2.

The load resistor 160 may be a variable resistor. The resistance value of the load resistor 160 may be changed by a signal transmitted to the processor 170.

In some implementations, the processor 170 may adjust the load resistance value of the load resistor 160 based on an electrical conductivity change amount of the sensor 110.

Next, referring to FIGS. 5 to 6, a method of adjusting the load resistance value of the load resistor 160 by the processor 170 will be described.

Figure 5:
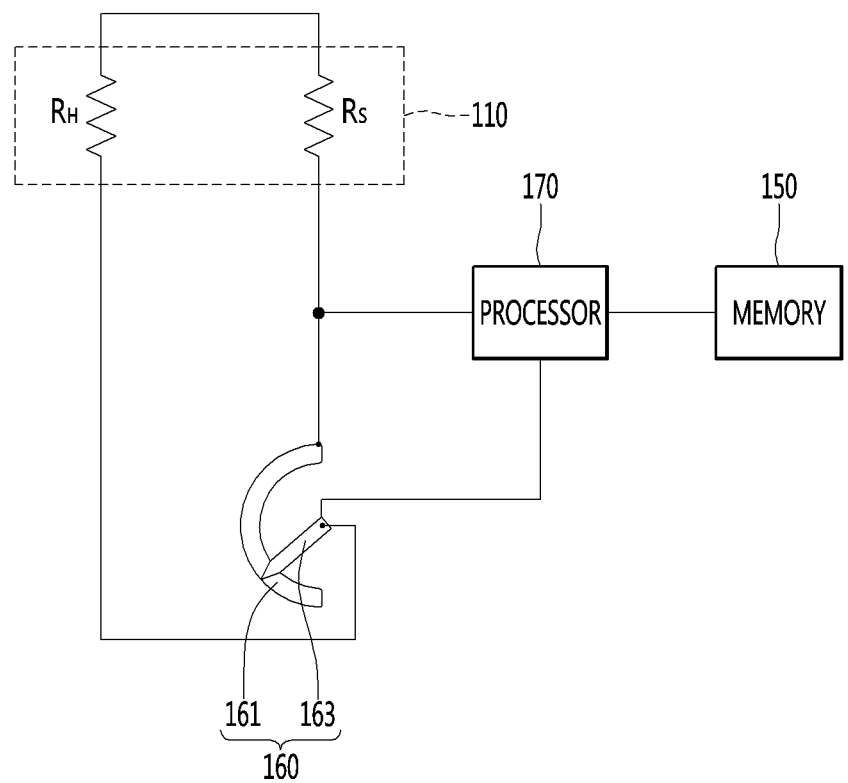
FIG. 5 is an example of a control block diagram of an example sensor module.
Figure 6:
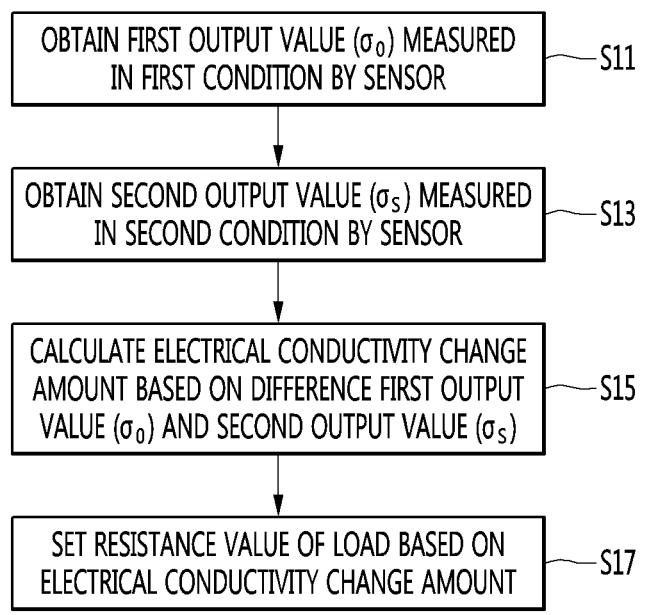
FIG. 6 is a flowchart showing an example of an operation method of a sensor module.

FIG. 5 is a control block diagram of the sensor module according to an implementation of the present disclosure, and FIG. 6 is a flowchart showing an operation method of the sensor module according to an implementation of the present disclosure.

The sensor module 100 may include at least some or all of the sensor 110, the load resistor 160, the processor 170, or the memory 150. In some implementations, the memory 150 may be a non-transitory memory operably connected to the processor 170.

Although only part of the configuration necessary for explaining the operation method of the sensor module according to the present disclosure is illustrated in FIG. 5, this is merely an example. The sensor module 100 may further include other configuration besides the configuration illustrated in FIG. 5.

The load resistor 160 may be a variable resistor. The configuration and the operation method of the variable resistor may be diverse. Since the variable resistor illustrated in FIG. 5 is merely an example, the load resistor 160 according to the implementation of the present disclosure is not limited to the variable resistor illustrated in FIG. 5.

The processor 170 may obtain a first output value $\sigma_0$ measured in a first condition by the sensor 110 (S11).

The first condition may be a state in which the sensor 110 is disposed in a space formed such that the gas concentration of inside air falls within a preset clean range. Therefore, the first output value $\sigma_0$ may be a sensing value output by the sensor 110 in the air whose gas concentration falls within the preset clean range. That is, the first output value $\sigma_0$ may be the output value of the sensor 110 in clean air.

The processor 170 may obtain a second output value $\sigma_s$ measured in a second condition by the sensor 110 (S13).

The second condition may be a state in which the sensor 110 is disposed in a space formed such that the gas concentration of inside air falls within a preset contamination range. Therefore, the second output value $\sigma_s$ may be a sensing value output by the sensor 110 in the air whose gas concentration falls within the preset contamination range. That is, the second value output value $\sigma_S$ may be the output value of the sensor 110 in contaminated air.

The contamination range may be higher than the clean range. For example, the clean range may include a range in which the gas concentration is equal to or less than a first reference value (1 ppm), and the contamination range may include a range in which the gas concentration is equal to or greater than a second reference value (500 ppm), but this is merely an example. The present disclosure is not limited thereto. The first and second reference values may change according to the gas to be measured by the sensor 110.

The processor 170 may calculate the electrical conductivity change amount based on a difference between the first output value $\sigma_0$ and the second output value $\sigma_S$ (S15).

The processor 170 may calculate the electrical conductivity change amount based on the difference between the first output value $\sigma_0$ measured in the first condition by the sensor 110 and the second output value $\sigma_0$ measured in the second condition by the sensor 110.

The difference between the first output value $\sigma_0$ and the second output value $\sigma_S$ may correspond to the electrical conductivity change amount of the sensor 110. That is, the processor 170 may obtain the electrical conductivity change amount through the internal resistance change amount of the sensing material of the sensor 110.

The processor 170 may set the load resistance value of the load resistor $R_L$ based on the electrical conductivity change amount (S17).

Specifically, the processor 170 may adjust the resistance value of the load resistor $R_L$ to be smaller as the electrical conductivity change amount increases. The processor 170 may recognize that the sensitivity of the sensor 110 is high when the electrical conductivity change amount is large. In this case, the resistance value of the load resistor $R_L$ may be adjusted to be small. The processor 170 may recognize that the sensitivity of the sensor 110 is low when the electrical conductivity change amount is small. In this case, the resistance value of the load resistor $R_L$ may be adjusted to be large.

In this manner, the electrical conductivity $\sigma$ of the sensor 110 at the resistor $R_S$ may be adjusted.

The electrical conductivity $\sigma$ of the sensor 110 at the resistor $R_S$ may be calculated by Equation 1 below.

$$\sigma = \frac{V_{RL}}{(V_C - V_{RL}) \times R_L} \quad \langle \text{Equation 1} \rangle$$

In the case of the sensor module 100 in which the resistance value of the load resistor $R_L$ is variable, the electrical conductivity $\sigma$ may be calculated by Equation 2 below.

$$\sigma_s^* = \frac{\sigma_s \times R_L^*}{R_L} \quad \langle \text{Equation 2} \rangle$$

$R_L^*$ represents a changed load resistance value, and $\sigma^*$ represents a changed electrical conductivity according to a change in the resistance value of the load resistor $R_L$.

Therefore, when the resistance value of the load resistor $R_L$ is adjusted to be small, the electrical conductivity $\sigma$ also decreases. That is, the magnitude of the electrical conductivity $\sigma$ may be reduced in proportion to the resistance value of the load resistor $R_L$ of the load resistor 160.

In some implementations, when the resistance value of the load resistor $R_L$ is adjusted to be large, the electrical conductivity $\sigma$ also increases. That is, the magnitude of the electrical conductivity $\sigma$ may be increased in proportion to the resistance value of the load resistor $R_L$ of the load resistor 160.

In some examples, the electrical conductivity $\sigma$ of the sensor 110 may be converged to a predetermined range by adjusting the resistance value of the load resistor $R_L$ of the load resistor 160. Therefore, there is an effect that the gas concentration scattering of the sensor 110 is reduced.

In some implementations, the memory 150 may store variable resistance information in which a load resistance value for each electrical conductivity change amount is mapped, and the processor 170 may obtain a load resistance value corresponding to the electrical conductivity change amount based on the variable resistance information.

For example, the variable resistance information may include data in which the electrical conductivity change amount of 100 and the load resistance value of 13.5 k are mapped, data in which the electrical conductivity change amount of 90 and the load resistance value of 15 k are mapped, and data in which the electrical conductivity change amount of 80 and the load resistance value of 16.5 k are mapped. The processor 170 may obtain the load resistance value by extracting the load resistance value corresponding to the electrical conductivity change amount from the variable resistance information.

In some examples, the processor 170 may determine one of a plurality of load resistance values stored in the variable resistance information corresponding to the electrical conductivity change amount. For example, when the electrical conductivity change amount is closer to a first load resistance value than to a second load resistance value stored in the variable resistance information, the processor 170 may determine the first load resistance value as the load resistance value of the load resistor 160. In some examples, the processor 170 may determine a value adjusted based on a ratio between a reference change amount (e.g., an average change amount) and a first electrical conductivity change amount corresponding to the first load resistance value as the load resistance value of the load resistor 160.

In some implementations, when the electrical conductivity change amount corresponds to an average change amount, the processor 170 may adjust the load resistance value to a preset standard resistance value. When the electrical conductivity change amount is larger than the average change amount, the processor 170 may adjust the load resistance value to be smaller than the standard resistance value by a ratio corresponding to the difference between the electrical conductivity change amount and the average change amount. When the electrical conductivity amount change is smaller than the average change amount, the processor 170 may adjust the load resistance value to be larger than the standard resistance value by the ratio corresponding to the difference between the average change amount and the electrical conductivity change amount.

For example, the average change may be 90, and the standard resistance value may be 15 k. When the electrical conductivity change amount is 100, the processor 170 may set the load resistance value to 13.5 k which is 10% smaller than 15 k. When the electrical conductivity change amount is 80, the processor 170 may set the load resistance value to 16.5 k which is 10% larger than 15 k.

The numerical values in the above examples are merely illustrative for convenience of description, and are not limited thereto.

The processor 170 may adjust the load resistor 160 based on the load resistance value obtained based on the electrical conductivity change amount.

The load resistor 160 may include a resistor element 161 and a contactor 163 that determines at least one of the length or the cross-sectional area of the resistor element 161. For example, the contactor 163 may be configured to connect various contact positions of the resistor element 161 and change the length or the cross-sectional area of the resistor element 161 that conducts the current. That is, the contactor 163 may define a first area of the resistor element 161 that carries the current and a second area of the resistor element 161 that does not carry the current. The contact positions may be continuously arranged along the resistor element 161, or intermittently arranged along the resistor element 161. In some cases, the contactor 163 may be a slider configured to move between a first end and a second end of the resistor element 161. In some cases, the resistor element 161 may be made of a metal material, a semiconductor material, an insulator material, or any combination thereof.

The processor 170 may be connected to the contactor 163 and may move the contactor 163 according to the electrical conductivity change amount. In some implementations, the processor 170 may control the contactor 163 such that the resistance value $R_L$ of the load resistor 160 corresponds to the load resistance value obtained according to the electrical conductivity change amount.

As described above, when the internal resistor of the sensing material of the sensor 110 is different, the processor 170 may adjust the load resistance value of the load resistor 160 such that the gas concentration is calculated relatively equally in the same air condition, thereby reducing the gas concentration scattering of the sensor 110.

In some implementations, when the use time of the sensor 110 exceeds a set time after the load resistance value is adjusted, the processor 170 may re-obtain the electrical conductivity change amount of the sensor 110 and then change the load resistance value $R_L$.

That is, when the sensor 110 is used for the set time or more, the electrical conductivity σ may be changed by contamination in air or the like. Therefore, when the use time of the sensor 110 exceeds the set time, the processor 170 may re-obtain the electrical conductivity change amount of the sensor 110 and re-adjust the load resistance value $R_L$ according to the re-obtained electrical conductivity change amount.

Figure 7A:
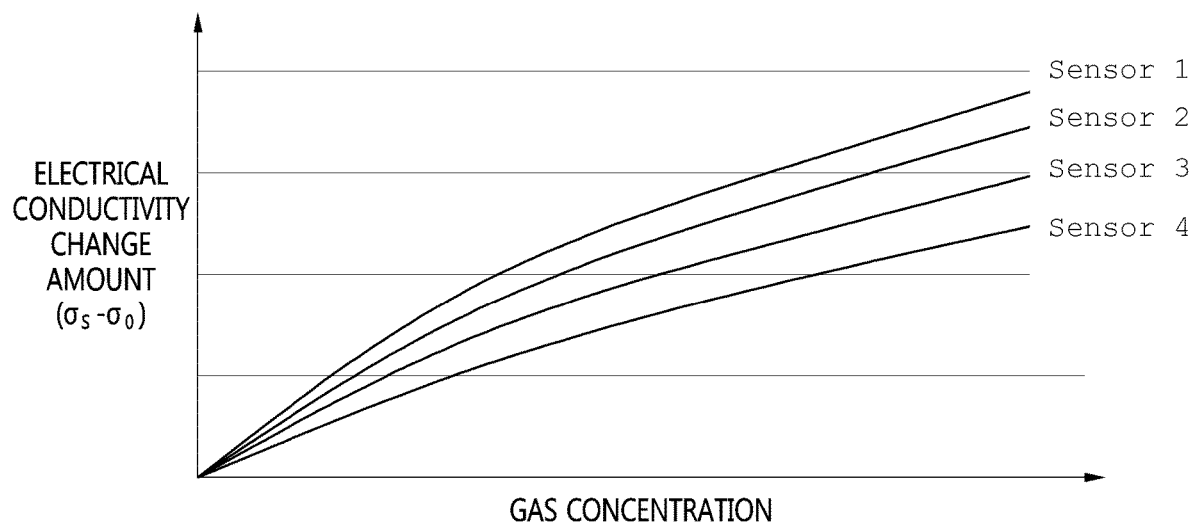
FIGS. 7A and 7B are views illustrating examples of a change in scattering of a sensor module.
Figure 7B:
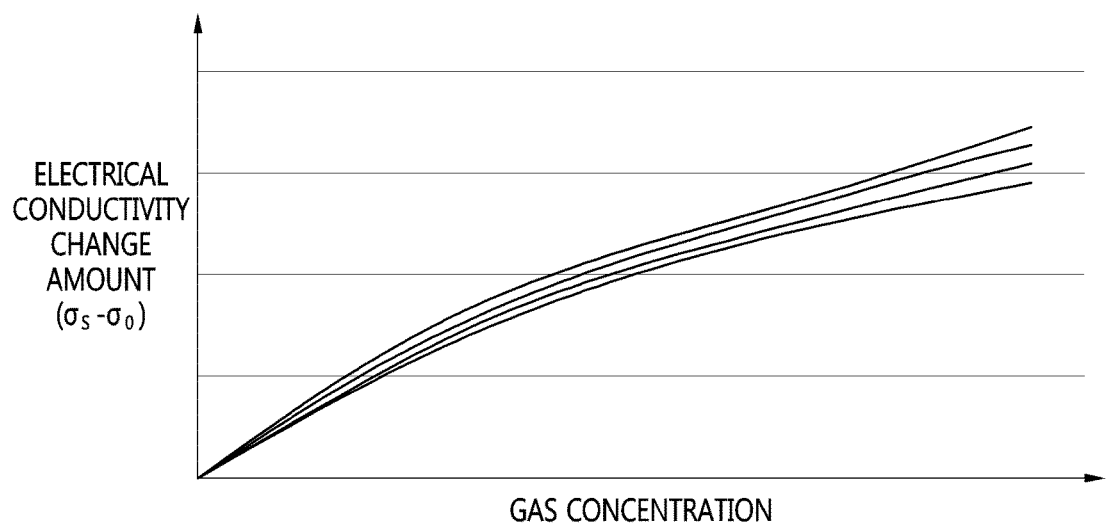

FIGS. 7A and 7B are graphs that illustrate examples of the scattering change of the sensor module.

Specifically, FIG. 7A is a graph showing the gas concentrations according to the electrical conductivity change amount $(\sigma_S - \sigma_0)$ of four sensor modules having the sensors 110 having different sensitivities. FIG. 7B is a graph showing the gas concentrations according to the electrical conductivity change amount $(\sigma_S - \sigma_0)$ after the four sensor modules in FIG. 7A adjust the load resistance value $R_L$ according to the flowchart of FIG. 6.

As illustrated in FIGS. 7A and 7B, the gas concentration scattering of the sensor module may be improved when the load resistance value $R_L$ is adjusted. For instance, when the same models of the sensor modules sense gas in air in the same condition, the gap between the output values may be reduced. In some implementations, the reliability of the product may be improved since the sensor module 100 includes the load resistor 160 whose load resistance value $R_L$ is variable, and the sensor module 100 adjusts the load resistance value $R_L$ according to the electrical conductivity change amount $(\sigma_S - \sigma_0)$.

In the case of the present disclosure, the scattering of the sensor 110 may be controlled in hardware rather than in the software using the load resistor 160, so that it is not necessary to individually tune one or more software components of the sensor module 100.

In some implementations, even if the physical properties of the sensor 110 may change during usage after shipment of the sensor module 100 and the sensitivity of the sensor 110 may change, there is an advantage that the scattering of the sensor 110 may be improved through adjustment of the load resistance value $R_L$ of the load resistor 160.

In some implementations, it may be possible to improve the gas concentration calculation scattering of the sensor module. Therefore, it may be possible to reduce errors during the gas concentration calculation of the sensor module and improve the reliability of the sensor module.

In some implementations, a measurement repeatability may be improved despite not only the sensitivity difference occurring in the process of manufacturing the sensor but also the sensitivity difference occurring in the process of using the sensor.

The above description is merely illustrative of the technical idea of the present disclosure, and various modifications and changes may be made thereto by those skilled in the art without departing from the essential characteristics of the present disclosure.

Therefore, the implementations of the present disclosure are not intended to limit the technical spirit of the present disclosure but to illustrate the technical idea of the present disclosure, and the technical spirit of the present disclosure is not limited by these implementations.

The scope of protection of the present disclosure should be interpreted by the appending claims, and all technical ideas within the scope of equivalents should be construed as falling within the scope of the present disclosure.

What is claimed is:

1. A sensor module comprising:
a sensor configured to sense gas in air;
a load resistor connected to the sensor;
a non-transitory memory configured to store variable resistance information that comprises a plurality of load resistance values and a plurality of electrical conductivity change amounts mapped to the plurality of load resistance values, respectively; and
a processor configured to determine a gas concentration of the gas in the air based on an internal resistor of the sensor and the load resistor,
wherein the processor is configured to obtain an electrical conductivity change amount of the sensor, and based on the variable resistance information, determine one load resistance value of the plurality of load resistance values corresponding to the electrical conductivity change amount of the sensor, and adjust a load resistance value of the load resistor based on the one load resistance value of the plurality of load resistance values.

2. The sensor module according to claim 1, wherein the processor is configured to determine the electrical conductivity change amount based on a difference between a first output value measured in a first condition by the sensor and a second output value measured in a second condition by the sensor.

3. The sensor module according to claim 2, wherein the first condition is a state in which the sensor is disposed in a first space having a first gas concentration of the gas within a preset clean range, and wherein the second condition is a state in which the sensor is disposed in a second space having a second gas concentration of the gas within a contamination range that is set to include greater gas concentrations of the gas than the preset clean range.

4. The sensor module according to claim 1, wherein the processor is configured to decrease the load resistance value based on an increase of the electrical conductivity change amount.

5. The sensor module according to claim 1, wherein the processor is configured to:
based on the electrical conductivity change amount corresponding to an average change amount, set the load resistance value to a preset standard resistance value;
based on the electrical conductivity change amount being greater than the average change amount, decrease the load resistance value to a first value that is less than the preset standard resistance value by a ratio corresponding to a difference between the electrical conductivity change amount and the average change amount; and
based on the electrical conductivity change amount being less than the average change amount, increase the load resistance value to a second value that is greater than the preset standard resistance value by the ratio corresponding to the difference between the electrical conductivity change amount and the average change amount.

6. The sensor module according to claim 1, wherein the load resistor comprises:
a resistor element; and
a contactor defining at least one of a length of the resistor element or a cross-sectional area of the resistor element, and
wherein the processor is connected to the contactor and configured to move the contactor relative to the resistor element according to the electrical conductivity change amount.

7. The sensor module according to claim 6, wherein the contactor defines a first portion of the resistor element that carries a current and a second portion of the resistor element that does not carry the current, and
wherein the processor is configured to, according to the electrical conductivity change amount, move the contactor relative to the resistor element to thereby vary lengths or areas of the first portion and the second portion of the resistor element.

8. The sensor module according to claim 1, wherein the sensor comprises:
a substrate;
a sensing member disposed on a first surface of the substrate; and
a heater disposed on a second surface of the substrate opposite to the first surface, and
wherein the processor is configured to obtain the electrical conductivity change amount based on a change amount of an internal resistance of the sensing member.

9. The sensor module according to claim 8, wherein the processor is configured to:
despite measurements of the internal resistance of the sensing member corresponding to different values in a same air condition, determine one gas concentration corresponding to the measurements by adjusting the load resistance value of the load resistor.

10. The sensor module according to claim 8, wherein the internal resistor and the load resistor are connected to each other electrically in series, and
wherein the heater comprises a heater resistor that is connected to the internal resistor and the load resistor electrically in parallel.

11. The sensor module according to claim 1, wherein the processor is configured to, based on a use time of the sensor exceeding a set time after the load resistance value is adjusted, re-obtain the electrical conductivity change amount of the sensor and then change the load resistance value.

12. The sensor module according to claim 1, wherein the sensor is configured to apply a division voltage to the processor, the division voltage corresponding to a ratio between an internal resistance value of the internal resistor and a sum of the internal resistance value and the load resistance value.

13. The sensor module according to claim 1, wherein the sensor is configured to output a plurality of output values corresponding to an electrical conductivity, and
wherein the processor is configured to determine the electrical conductivity change amount of the sensor based on a difference between the plurality of output values.

14. The sensor module according to claim 1, wherein the processor is configured to:
determine a first difference between the electrical conductivity change amount and a first electrical conductivity change amount among the plurality of electrical conductivity change amounts;
determine a second difference between the electrical conductivity change amount and a second electrical conductivity change amount among the plurality of electrical conductivity change amounts; and
based on the first difference being less than the second difference, determine a first load resistance value among the plurality of load resistance values corresponding to the first electrical conductivity change amount as an adjusted load resistance value.

15. A method for sensing gas in air using a sensor module that includes a sensor configured to sense the gas in the air, a load resistor connected to the sensor, and a processor connected to the sensor and the load resistor, the method comprising:
obtaining a first output value measured by the sensor in a first condition;
obtaining a second output value measured by the sensor in a second condition;
determining an electrical conductivity change amount based on a difference between the first output value and the second output value; and
setting a resistance value of the load resistor based on the electrical conductivity change amount,
wherein setting the resistance value of the load resistor comprises:
determining an adjusted resistance value of the load resistor based on variable resistance information that is stored in a non-transitory memory connected to the processor, the variable resistance information comprising a plurality of load resistance values and a plurality of electrical conductivity change amounts mapped to the plurality of load resistance values, respectively.

16. The method according to claim 15, further comprising:
based on setting the resistance value of the load resistor, determining a gas concentration of the gas based on the resistance value of the load resistor and a resistance value of an internal resistor of the sensor.

17. The method according to claim 16, wherein determining the gas concentration of the gas comprises:
   determining one gas concentration despite measurements of the resistance value of the internal resistor of the sensor corresponding to different values in a same air condition.

18. The method according to claim 15, wherein setting the resistance value of the load resistor comprises:
   based on the electrical conductivity change amount corresponding to an average change amount, setting the resistance value of the load resistor to a preset standard resistance value;
   based on the electrical conductivity change amount being greater than the average change amount, decreasing the resistance value of the load resistor to a first value that is less than the preset standard resistance value by a ratio corresponding to a difference between the electrical conductivity change amount and the average change amount; and
   based on the electrical conductivity change amount being less than the average change amount, increasing the resistance value of the load resistor to a second value that is greater than the preset standard resistance value by the ratio corresponding to the difference between the electrical conductivity change amount and the average change amount.

* * * * *